US008407644B2

(12) United States Patent
Cabrera et al.

(10) Patent No.: US 8,407,644 B2
(45) Date of Patent: Mar. 26, 2013

(54) REDUCING CROSSTALK IN THE DESIGN OF MODULE NETS

(75) Inventors: Dulce M. Altabella Cabrera, Cary, NC (US); Sungjun Chun, Austin, TX (US); Anand Haridass, Austin, TX (US); Tingdong Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/537,767

(22) Filed: Aug. 7, 2009

(65) Prior Publication Data

US 2011/0031627 A1 Feb. 10, 2011

(51) Int. Cl.
G06F 17/50 (2006.01)

(52) U.S. Cl. ........................................ 716/119; 716/115

(58) Field of Classification Search ........... 716/118–125
See application file for complete search history.

(56) References Cited

U.S. PATENT DOCUMENTS

| | | | |
|---|---|---|---|
| 4,490,690 A | 12/1984 | Suzuki | |
| 5,726,863 A | 3/1998 | Nakayama | |
| 6,444,922 B1 | 9/2002 | Kwong | |
| 6,704,277 B1 | 3/2004 | Dabral | |
| 6,726,863 B2 | 4/2004 | Lenthe | |
| 6,983,012 B1 | 1/2006 | Shen | |
| 6,983,023 B2 | 1/2006 | Osaka | |
| 7,047,515 B1* | 5/2006 | Vitek et al. | 716/115 |
| 2003/0223352 A1 | 12/2003 | Williams | |
| 2007/0130555 A1 | 6/2007 | Osaka | |
| 2008/0250373 A1* | 10/2008 | Bird et al. | 716/7 |
| 2008/0250377 A1* | 10/2008 | Bird et al. | 716/15 |

* cited by examiner

*Primary Examiner* — Binh Tat
(74) *Attorney, Agent, or Firm* — Yudell Isidore Ng Russell PLLC (57) ABSTRACT

A method, a system and a computer program product for reducing coupling noise in low loss on-module wires used for connecting module components in electrical circuits/devices. During the design stage, an Enhanced Crosstalk Reduction (ECR) utility identifies interconnect wires as driven/aggressor traces or receiver traces. The ECR utility substantially avoids forward crosstalk in a victim trace by specially arranging driver traces adjacent to the receiver victim trace in order to provide a lower level and saturated level of backward crosstalk. In particular, the ECR utility provided a configuration of wire/trace layers based on one or more of: (a) the crosstalk impact of a trace when positioned in a particular location; (b) the crosstalk impact of the trace upon remaining components based on placement in the particular location; and (c) system component specifications. In addition, the ECR utility reduces crosstalk by providing a configuration of receiver wires and transmitter wires without the use of isolation layers.

20 Claims, 6 Drawing Sheets

| Driver/Receiver configuration | Heye | Veye |
|---|---|---|
| DR DR DR<br>DR DR DR<br>RV RV RV | 87.5% | 198mV |
| DR DR DR<br>DR DR DR<br>DR DR DR | 73.5% | 141mV |
| DR DR DR<br>DR DR RV<br>RV RV RV | 87.5% | 192mV |
| DR DR DR<br>RV DR RV<br>RV RV RV | 73.5% | 166mV |
| RV RV RV<br>RV DR RV<br>RV RV RV | 79.4% | 200mV |
| DR DR RV<br>DR DR RV<br>DR DR RV | 73.1% | 144mV |
| DR DR RV<br>DR DR RV<br>RV RV RV | 87.5% | 179mV |

REDUCING CROSSTALK IN THE DESIGN OF MODULE NETS

BACKGROUND

1. Technical Field

The present invention generally relates to electrical circuits and in particular to signal coupling between interconnect wires in electrical circuits.

2. Description of the Related Art

In module and system design of electrical circuits/devices, the performance of the system and the quality of propagating signals at the receiver end of the circuit is directly impacted by the losses through the signal path and the coupling noise in the system. As signaling speed increases, coupling noise becomes even more critical. For the high speed data link in a digital system, there is usually a driver at one end of one net of the high speed link and one or multiple receivers at the other end of the net. Traditionally, wiring rules call for a separation between driver and receiver channels to minimize the effects of near end crosstalk (NEXT) coupling into the victim line. There are two types of crosstalk: (1) forward crosstalk; and (2) backward crosstalk. The magnitude of forward crosstalk is proportional to the length of a net. Backward crosstalk is also proportional to the coupled length of two nets. Backward crosstalk saturates at the smaller of (a) two times the time of flight of the signal on a net and (b) the rising time of the aggressor signal.

In order to minimize the effects of near end crosstalk coupling, conventional system designs utilize an increased number of layers to escape the effects that may be caused by a particular channel. For example, conventional system designs utilize isolation layers to increase separation between drivers and receivers. The increase in the number of layers, however, leads to a corresponding increase in the implementation costs of the circuits/devices.

BRIEF SUMMARY

Disclosed are a method, a system and a computer program product for reducing coupling noise in low loss on-module wires used for connecting module components in electrical circuits/devices. During the design stage, an Enhanced Crosstalk Reduction (ECR) utility identifies interconnect wires as driven/aggressor traces or receiver traces. The ECR utility substantially avoids forward crosstalk in a victim trace by specially arranging driver traces adjacent to the receiver victim trace in order to provide a lower level and saturated level of backward crosstalk. In particular, the ECR utility provided a configuration of wire/trace layers based on one or more of: (a) the crosstalk impact of a trace when positioned in a particular location; (b) the crosstalk impact of the trace upon remaining components based on placement in the particular location; and (c) system component specifications. In addition, the ECR utility reduces crosstalk by providing a configuration of receiver wires and transmitter wires without the use of isolation layers.

The above as well as additional objectives, features, and advantages of the present invention will become apparent in the following detailed written description.

BRIEF DESCRIPTION OF THE SEVERAL VIEWS OF THE DRAWINGS

The invention itself, as well as advantages thereof, will best be understood by reference to the following detailed description of illustrative embodiments when read in conjunction with the accompanying drawings, wherein.

DETAILED DESCRIPTION

The illustrative embodiments provide a method, a system/device and a computer program product for reducing coupling noise in low loss on-module wires used for connecting module components in electrical circuits/device. During the design stage, an Enhanced Crosstalk Reduction (ECR) utility identifies interconnect wires as driven/aggressor traces or receiver traces. The ECR utility substantially avoids forward crosstalk in a victim trace by specially arranging driver traces adjacent to the receiver victim trace in order to provide a lower level and saturated level of backward crosstalk. In particular, the ECR utility provided a configuration of wire/trace layers based on one or more of: (a) the crosstalk impact of a trace when positioned in a particular location; (b) the crosstalk impact of the trace upon remaining components based on placement in the particular location; and (c) system component specifications. In addition, the ECR utility reduces crosstalk by providing a configuration of receiver wires and transmitter wires without the use of isolation layers.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
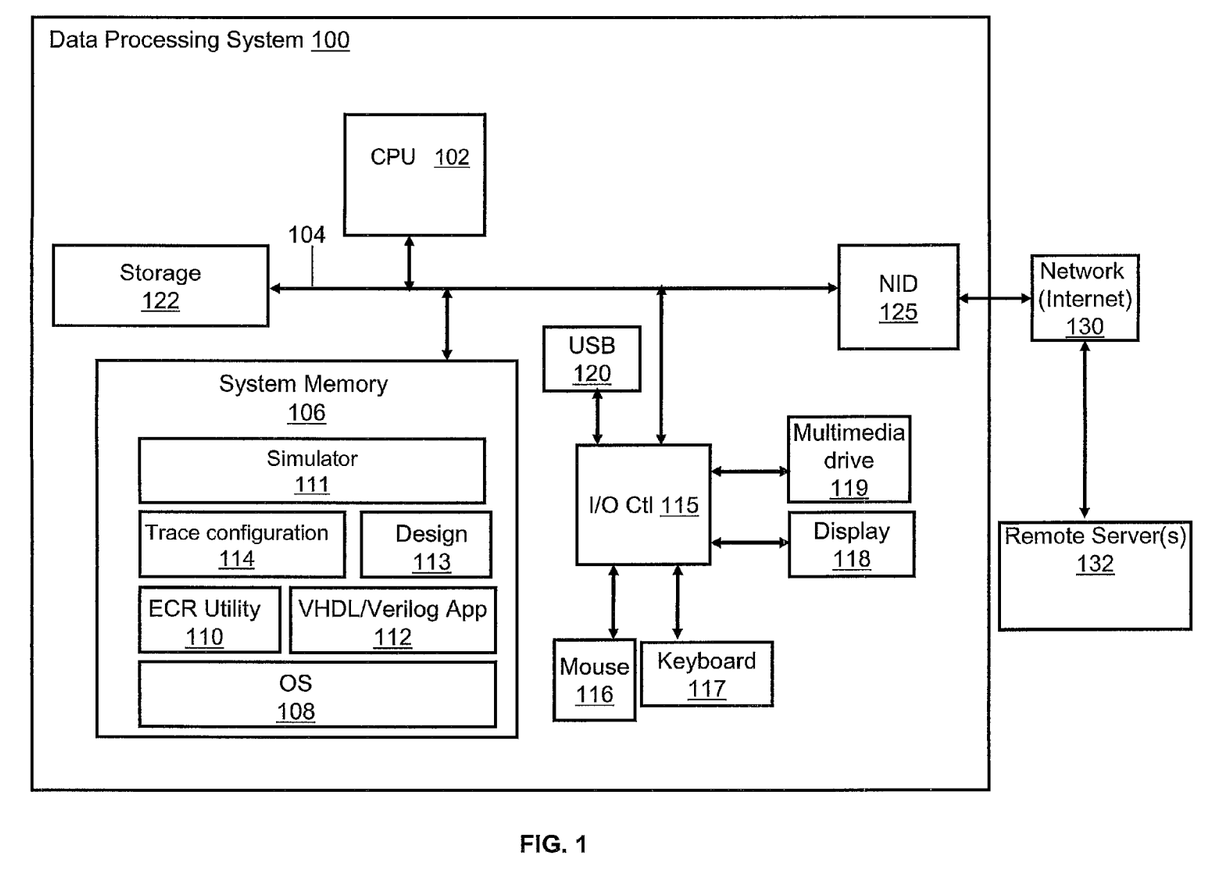
FIG. 1 provides a block diagram representation of an example data processing system within which features of one embodiment of the invention may be practiced.

With reference now to the figures, and beginning with FIG. 1, there is depicted a block diagram representation of an example data processing system (DPS), as utilized within one embodiment. DPS 100 may be a computer, a portable device, such as a personal digital assistant (PDA), a smart phone, and/or other types of electronic devices that may generally be considered processing devices. As illustrated, DPS 100 comprises at least one processor or central processing unit (CPU) 102 connected to system memory 106 via system interconnect/bus 104. Also connected to system bus 104 is input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 120 are illustrated, coupled to I/O controller 115. Multimedia drive 119 and USB port 120 enable insertion of a removable storage device (e.g., optical disk or "thumb" drive) on which data/instructions/code may be stored and/or from which data/instructions/code may be retrieved. DPS 100 also comprises storage 122, within/from which data/instructions/code may also be stored/retrieved. DPS 100 is also illustrated with a network interface device (NID) 125, by which DPS 100 may connect to one or more remote servers 132 via one or more access/external networks 130, of which the Internet is provided as one example.

In addition to the above described hardware components of DPS 100, various features of the invention are completed/supported via software (or firmware) code or logic stored within memory 106 or other storage (e.g., storage 122) and executed by CPU 102. Thus, for example, illustrated within memory 106 are a number of software/firmware/logic components, including operating system (OS) 108 (e.g., Microsoft Windows®, a trademark of Microsoft Corp, or GNU®/Linux®, registered trademarks of the Free Software Foundation and The Linux Mark Institute), Very High Speed Integrated Circuits Hardware Description Language (VHDL)/Verilog application 112, simulator 111, trace configuration 114 and Enhanced Crosstalk Reduction (ECR) utility 110. Also included in memory 106 is (electrical) design 113. In actual implementation, ECR utility 110 may be combined with one or more other software modules, including VHDL/Verilog application 112, design 113 and trace configuration 114, to provide a single executable component, collectively providing the various functions of each individual software component when the corresponding combined code of the executable component is executed by the CPU 101. For simplicity, ECR utility 110 is illustrated and described as a standalone or separate software/firmware component/module, which provides specific functions, as described below. As a standalone component/module, ECR utility 110 may be acquired as an off-the-shelf or after-market enhancement to existing program applications, such as VHDL/Verilog application 112. In at least one implementation, ECR utility 110 may be downloaded from a server or website (e.g., remote server 132), and installed on DPS 100 or executed from the server.

CPU 101 executes ECR utility 110 as well as OS 108, which supports the user interface features of ECR utility 110, such as generation of a graphical user interface (GUI), where supported/provided by ECR utility 110. In the described embodiment, ECR utility 110 generates/provides one or more GUIs to enable user interaction with, or manipulation of, functional features of ECR utility 110.

Certain of the functions supported and/or provided by ECR utility/logic 110 are enabled as processing logic (or code) executing on DSP/processor 102 and/or other device hardware, which processing logic completes the implementation of those function(s). Among the software code/instructions/logic provided by ECR utility 110, and which are specific to the described embodiments of the invention, are: (a) code/logic for identifying interconnect paths as transmitter or receiver paths based on a digital design; (b) code/logic for providing an optimally low level of forward crosstalk in a victim trace by selecting a configuration with a particular layer arrangement of driven traces and receiver traces; and (c) code/logic for reducing crosstalk by configuring wire layers without the use of isolation layers. According to the illustrative embodiments, when CPU 102 executes ECR utility 110, CPU 102/DPS 100 initiates a series of functional processes that enable the above functional features as well as additional features/functionality. These features/functionalities are described in greater detail below within the description of FIGS. 2-6.

Those of ordinary skill in the art will appreciate that the hardware components and/or basic configuration depicted in FIG. 1 (and the configurations depicted within other figures presented herein) may vary. The illustrative components within these figures (e.g., DPS 100) are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
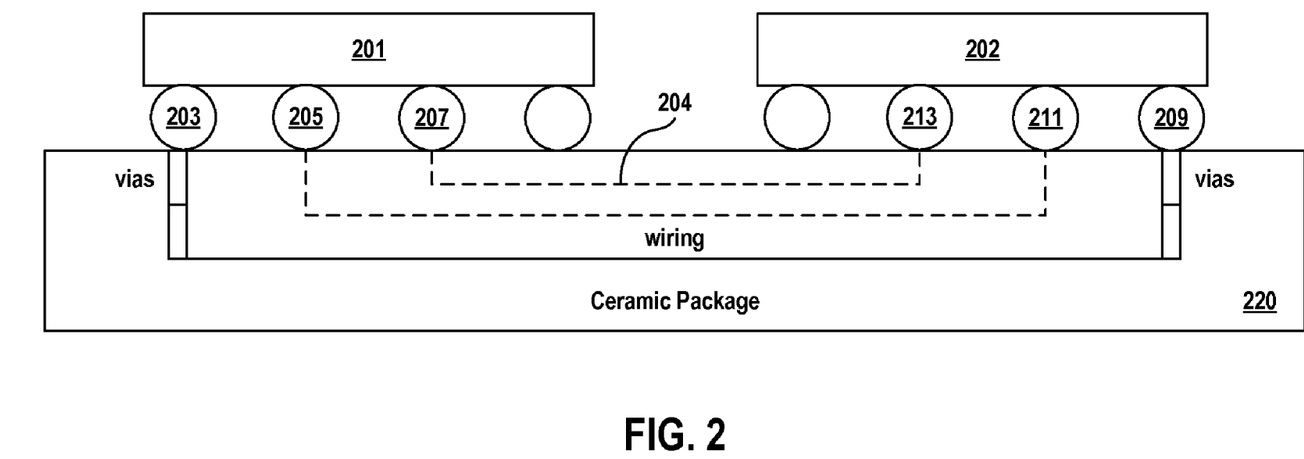
FIG. 2 provides a block diagram representation of an example electrical system/module/device having a pair of electrical components, according to one embodiment.

With reference now to FIG. 2, there is depicted a block diagram design representation of an example electrical system/module/device having a pair of electrical components, as utilized within one embodiment. Module 200 is multi-chip-module (MCM) which comprises first integrated circuit (IC) 201 and second IC 202 interconnected to each other by one or more wiring within a ceramic package/substrate 220. First IC 201 comprises multiple (interconnect) terminals/pins including first terminal/pin 203, second terminal/pin 205 and third terminal/pin 207. Similarly, second IC 202 comprises multiple (interconnect) terminals/pins including fourth terminal/pin 209, fifth terminal/pin 211 and sixth terminal/pin 213. As illustrated, first terminal/pin 203 is connected to fourth terminal/pin 209 via wire/trace 208. Second terminal/pin 205 is connected to fifth terminal/pin 211 via wire/trace 206. In addition, third terminal/pin 207 is connected to sixth terminal/pin 213 via wire/trace 204.

The wire traces connecting one module component to another collectively comprise the wire trace configuration. In the described embodiment, wire/trace 206 is identified as a victim trace which receives a crosstalk impact from two adjacent neighbors, wire/trace 204 and wire/trace 208.

Figure 3:
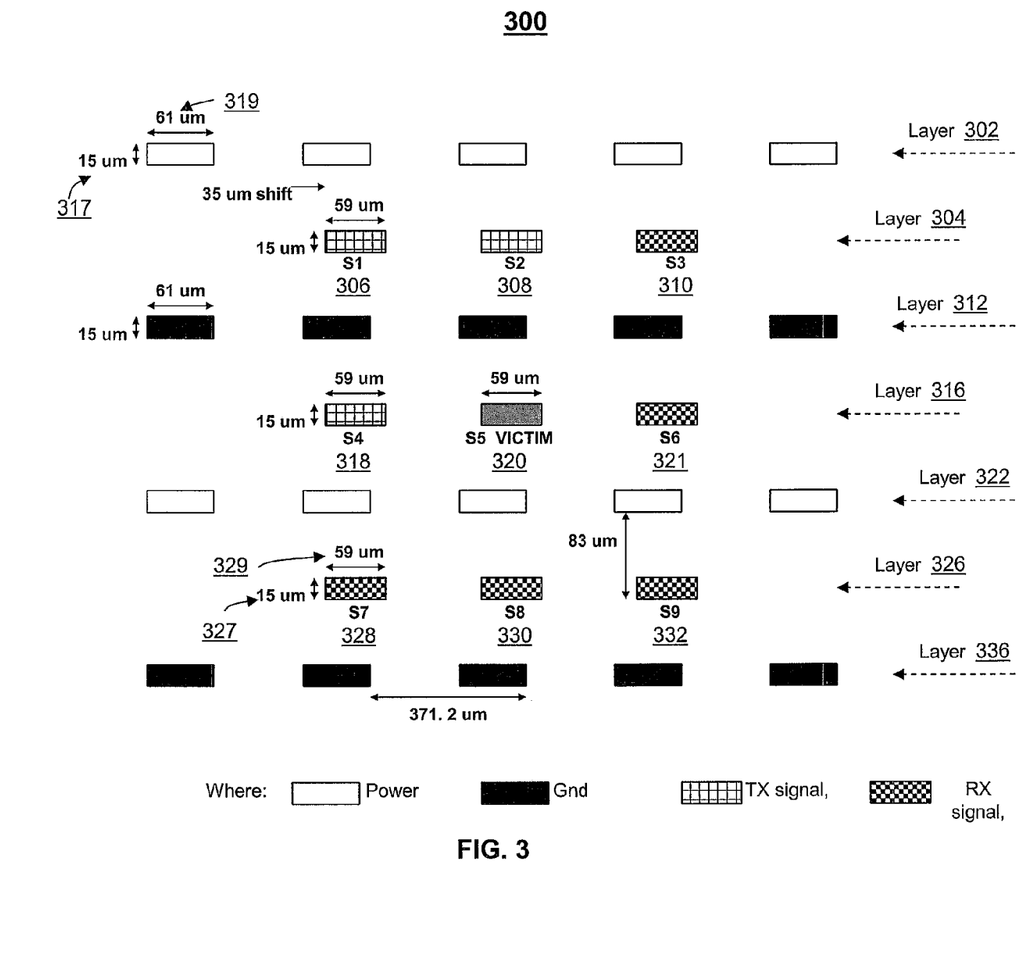
FIG. 3 illustrates a block diagram representation of an example cross-section of a configuration of wiring layers within an electrical system, as provided within one embodiment.

FIG. 3 illustrates a block diagram representation of an example cross-section of a configuration of wiring layers within an electrical system/device, according to one embodiment. Layer configuration 300 comprises seven layers including first power layer 302, second power layer 322, first ground layer 312 and second ground layer 336. Layer configuration 300 also comprises first interconnect (or signal) layer 304, second interconnect layer 316 and third interconnect layer 326. The wire dimensions for power and ground layer traces are identical. For example, the wire dimensions for power and ground layer traces are illustrated by height dimension 317 and width dimension 319. According to the illustrative embodiment, each of the interconnect (signal) layers comprises a plurality of signal traces. For example, first interconnect layer 304 comprises two transmit (TX) signal paths and one receive (RX) signal path. S1 trace 306, S2 trace 308 and S4 trace 318 are implemented as wire/traces for transmitter/driver signals. On the other hand, S3 trace 310, S6 trace 321, S7 trace 328, S8 trace 330 and S9 trace 332 are implemented as wire traces for receiver signals. Transmitter signal traces, receiver signal traces and S5 victim trace 320 have identical physical dimensions as is illustrated by second height dimension 327 and second width dimension 329.

Within layer configuration 300, ECR utility 110 identifies signal5 (S5) trace 320 as the (primary) victim trace. S5 (victim) trace 320 is designated as the victim trace as a result of the interconnect's central location and the signal coupling effects of having the largest set of adjacent signal traces (compared with the other illustrated signal traces). For S5 victim trace 320, the set of adjacent signal traces includes S4 trace 318 and S6 trace 321 on the same layer (i.e., second interconnect layer 316) as S5 trace 320. The adjacent signal traces also includes S2 trace 308 from first interconnect layer 304 and S8 trace 330 from third interconnect layer 326. The adjacent signal traces cause capacitively-coupled and/or inductively-coupled currents to flow within S5 (victim) trace 320. Layer configuration 300 also comprises four (four) "corner" traces (i.e., traces which may be more generally designated as non-adjacent traces relative to a victim trace). These corner traces include S1 trace 306 and S3 trace 310, both located within first interconnect layer 304 and S7 trace 328 and S9 trace 332, both located within third interconnect layer 326.

Within the same layer, a signal trace is separated from the nearest neighbor by 371.2 micrometers (i.e., the distance between intra-layer adjacent traces), according to layer configuration 300. A signal trace on a first layer is separated from a nearest neighbor on an adjacent layer by 166 micrometers (i.e., the distance between inter-layer adjacent traces). Thus, the distance between intra-layer adjacent traces (i.e., 371.2 micrometers) is more than twice as large as the distance between inter-layer adjacent traces (i.e., 166 micrometers).

Based on the larger slew rate of transmitter signals, transmitter signals generally contribute a higher level of forward crosstalk and backward crosstalk to adjacent and/or victim lines, whereas receiver signals contribute a lower level of forward crosstalk and backward crosstalk to adjacent and/or victim lines.

According to system/module/device requirements, ECR utility 110 identifies one or more of: (a) a first set of module components to be connected via driven traces; and (b) a second set of module components to be connected via receiver traces. In general, a transmitter output signal is carried along a driven trace and a receiver input signal is transported via a receiver trace.

In a high speed data link, the crosstalk noise propagated to the receiver has significant greater impact to the performance of the high-speed link/module. The crosstalk noise propagated to the driver end has minimal impact to bus performance unless the noise is reflected from the driver end to the receiver end of the same net. For on-module nets, since non-precompensation drivers are usually employed, the reflected noise is negligible In order to provide an optimally low level of crosstalk to the receiver that is at one end of the adjacent traces, ECR utility 110 places lower level contributors of crosstalk (e.g., driver traces to receiver traces) adjacent to receiver traces. In addition, ECR utility 110 optimally places higher level contributors of crosstalk (i.e., driver traces to driver traces or receiver traces to receiver traces) such that the separation distance between adjacent signal traces are at a maximum level. ECR utility implements this placement whenever such placement is practical based on system/module/device design specifications. As the separation distance increases, the crosstalk impact decreases. In the example of layer configuration 300, the maximum separation distance of adjacent traces is obtained by adjacent traces located within the same layer. The level of crosstalk at the other/receiver end of the driver trace is a lower and saturated level of backward crosstalk compared to the higher level of forward crosstalk that otherwise occurs at the other/receiver end when a driver trace is placed adjacent to another driver trace. As a result, ECR utility 110 optimally reduces crosstalk by placing lower level contributors of crosstalk (e.g., driver traces to receiver traces) adjacent to receiver traces within the same layer if such an arrangement is practical, according to design specifications.

However, when the layout requires that a driver trace is placed adjacent to another driver trace, ECR utility 110 places higher level contributors of crosstalk (e.g., transmitters/driver traces) adjacent to each other within the same layer if such an arrangement is practical, according to design specifications. Thus, ECR utility 110 selects a particular type of trace as an intra-layer adjacent trace to a first trace within a same layer based on one or more of: (a) an amount of crosstalk that the particular type of trace is capable of providing as the intra-layer adjacent trace; (b) a level of crosstalk that the particular type of trace is capable of providing as an inter-layer adjacent trace; (c) the impact of crosstalk that the particular type of trace is capable of providing as a non-adjacent trace; (d) system/module/device component specifications and/or requirements; and (e) the crosstalk impact to remaining components based on placement of the particular trace.

ECR utility 110 also reduces crosstalk by placing lower level contributor of crosstalk (e.g., driver trace to receiver trace) adjacent to a receiver trace in a different layer if such an alternating trace arrangement is practical, according to design specifications. However, as a result of the smaller separation distance that exists between adjacent traces on different layers (based on the inter-layer separation distance of layer configuration 300), ECR utility 110 achieves a smaller reduction in crosstalk impact in placing driver traces from one layer adjacent to receiver traces in another layer when compared to the larger reduction in crosstalk impact in placing driver traces adjacent to receiver traces in the same layer.

However, ECR utility 110 may place lower level contributors of crosstalk (e.g., receivers) from the second/different layer adjacent to other lower level contributors of crosstalk (e.g., other receivers) from the first layer if such an arrangement is practical and the previous type of alternating trace arrangement is impractical.

Thus, ECR utility 110 chooses a particular type of trace for a location in a second layer as an inter-layer adjacent trace for the first trace within the first layer based on one or more of: (a) an level of crosstalk that the particular type of trace in the second layer is capable of providing as the inter-layer adjacent trace; (b) the level of crosstalk that the particular type of trace is capable of providing as an intra-layer adjacent trace; (c) the impact of crosstalk that the particular type of trace is capable of providing as a non-adjacent trace; (d) system/module/device component specifications and/or requirements; and (e) the crosstalk impact to remaining components based on placement of the particular trace.

In layer configuration 300, ECR utility 110 creates a configuration which comprises five receiver traces and three (3) transmitter traces surrounding a victim trace. ECR utility 110 places S5 victim trace 320 in the central location relative to the eight available positions. In addition to the victim status, S5 victim trace 320 is implemented as a transmitter trace in layer configuration 300. ECR utility 110 arranges two higher crosstalk contributors (i.e., S1 trace 306 and S2 trace 308) adjacent to each other on the same layer (i.e., first interconnect layer 304) to minimize the crosstalk impact based on the larger intra-layer separation distance. The remaining six slots are to be filled by five receiver traces and one transmitter trace. ECR utility 110 places a receiver trace, S3 trace 310, adjacent to driver trace, S2 trace 308, within the same layer (i.e., first interconnect layer 304). In addition, ECR utility 110 places a trace for the remaining transmitter signal adjacent to S5 victim trace 320 as S4 trace 318, rather than placing the remaining transmitter signal adjacent to the other transmitter traces within first interconnect layer 304. ECE utility 110 strategically positions the third driver trace as S4 trace 318 rather than placing the third driver trace within first interconnect layer 304 to limit the number of receiver traces which receive inter-layer crosstalk impact from adjacent driver traces. In addition, ECE utility 110 also limits the total number of adjacent transmitter traces (i.e., the combined number of inter-layer and intra-layer adjacent traces) impacting a receiver trace by preventing any of the receiver traces from receiving crosstalk impact from more than one adjacent transmitter trace. In layer configuration 300, ECE utility 110 is able to provide placement for a pair of receiver traces (i.e., S8 trace 330 and S6 trace 321) adjacent to S5 victim/driver trace 320. As a result, ECE utility 110 reduces the crosstalk impact at the other/receiver end of S5 victim/driver trace 320. Thus, the level of crosstalk at the other/receiver end of S5 victim/driver trace 320 is a lower and saturated level of backward crosstalk compared to the higher level of forward crosstalk that otherwise occurs at the other/receiver end if a driver trace is placed adjacent to S5 victim/driver trace 320. ECE utility 110 factors/includes the higher level crosstalk impact from S5 (victim) trace 320 in determining the crosstalk impact of adjacent transmitter traces on other traces. ECE utility 110 allocates the remaining five receiver traces to the remaining five available positions.

ECR utility 110 provides an optimally low level of forward crosstalk in a victim trace by using a strategically configured layout/arrangement of driven traces and receiver traces, without the implementation of isolation layers. Thus, ECR utility 110 effectively replaces the higher noise contributor of crosstalk with the lower noise contributor of crosstalk whenever a receiver trace, instead of an aggressor trace, is utilized/implemented adjacent to a driver trace.

According to design specifications and layout feasibility, ECE utility 110 provides a layer configuration based on a level of one or more of: (a) crosstalk noise which results from placing receiver traces adjacent to transmitter traces; (b) crosstalk noise associated with an inter-layer separation distance of adjacent traces; (c) crosstalk noise associated with an intra-layer separation distance of adjacent traces; and (d) crosstalk noise which affects one or more particular components based on a placement of a particular trace; and (d) crosstalk noise that results from a non-adjacent trace placement.

Figure 4A:
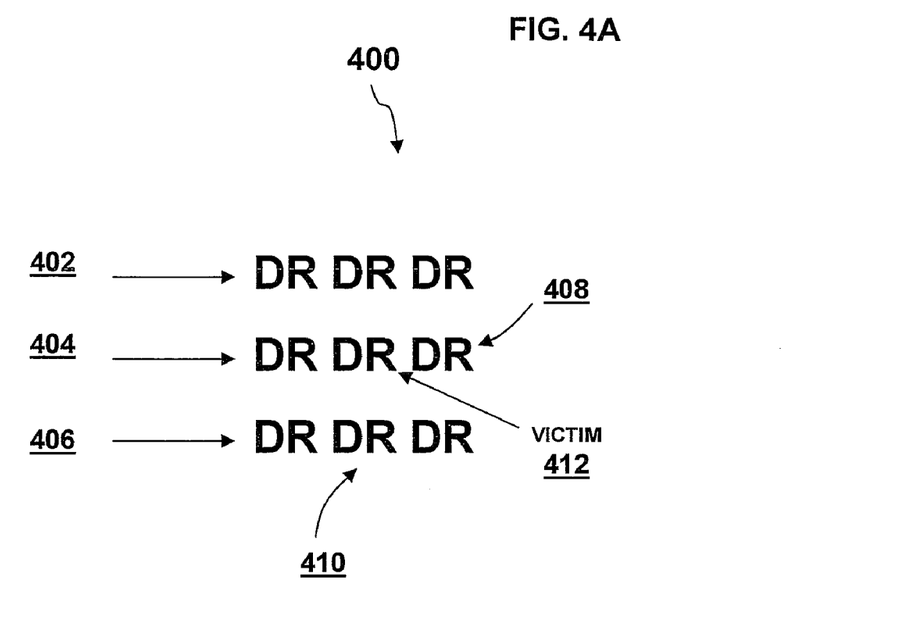
FIG. 4A illustrates an example cross-section of a configuration of wiring layers within an electrical system/device, according to one embodiment.

FIG. 4A illustrates an example cross-section of a configuration of wiring layers within an electrical system, according to one embodiment. Layer configuration 400 comprises three layers including first layer 402, second layer 404 and third layer 406. In layer configuration 400, a single victim is surrounded by eight (8) aggressors. Signal switching occurs in the 8 aggressors in the same direction as signal switching occurring in the victim line. Based on the available system components and device specifications, ECR logic/utility 110 exclusively surrounds a single victim trace by transmitter/driven traces. Thus, the level of noise coupling into the victim line is expected to approach a relatively high level of noise compared to a configuration with identical physical dimensions, which has receiver traces exclusively surrounding the victim trace (as illustrated in FIG. 4B).

Figure 4B:
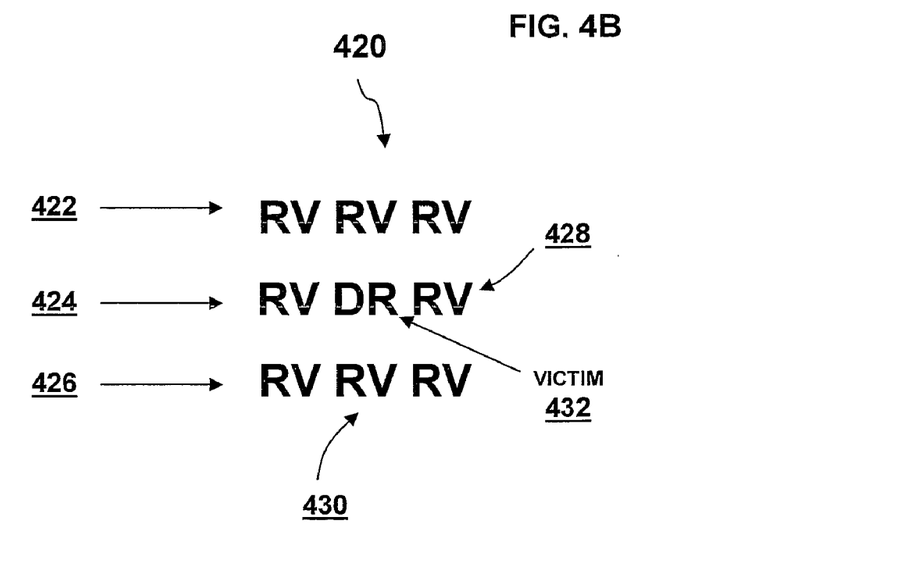
FIG. 4B illustrates another example cross-section of a configuration of wiring layers within an electrical system/device, according to one embodiment.

FIG. 4B illustrates another example cross-section of a configuration of wiring layers within an electrical system, according to one embodiment. Layer configuration 420 comprises three layers including first layer 422, second layer 424 and third layer 426. In layer configuration 420, a single victim is surrounded by eight (8) receivers. Based on the available system components and specifications, ECR logic/utility 110 exclusively surrounds a single victim trace by receiver traces. Thus, the level of noise coupling into the victim line is expected to approach a relatively low level of noise compared to a configuration with identical physical dimensions which has transmitter traces exclusively surrounding the victim trace (as illustrated in FIG. 4A). The FIG. 4B configuration is a preferred configuration to that of FIG. 4A, and ECR logic/utility 110 executes to provide as optimal a configuration (approaching that of FIG. 4B) as is practical, given the considerations of available system components and device specifications.

Figure 5:
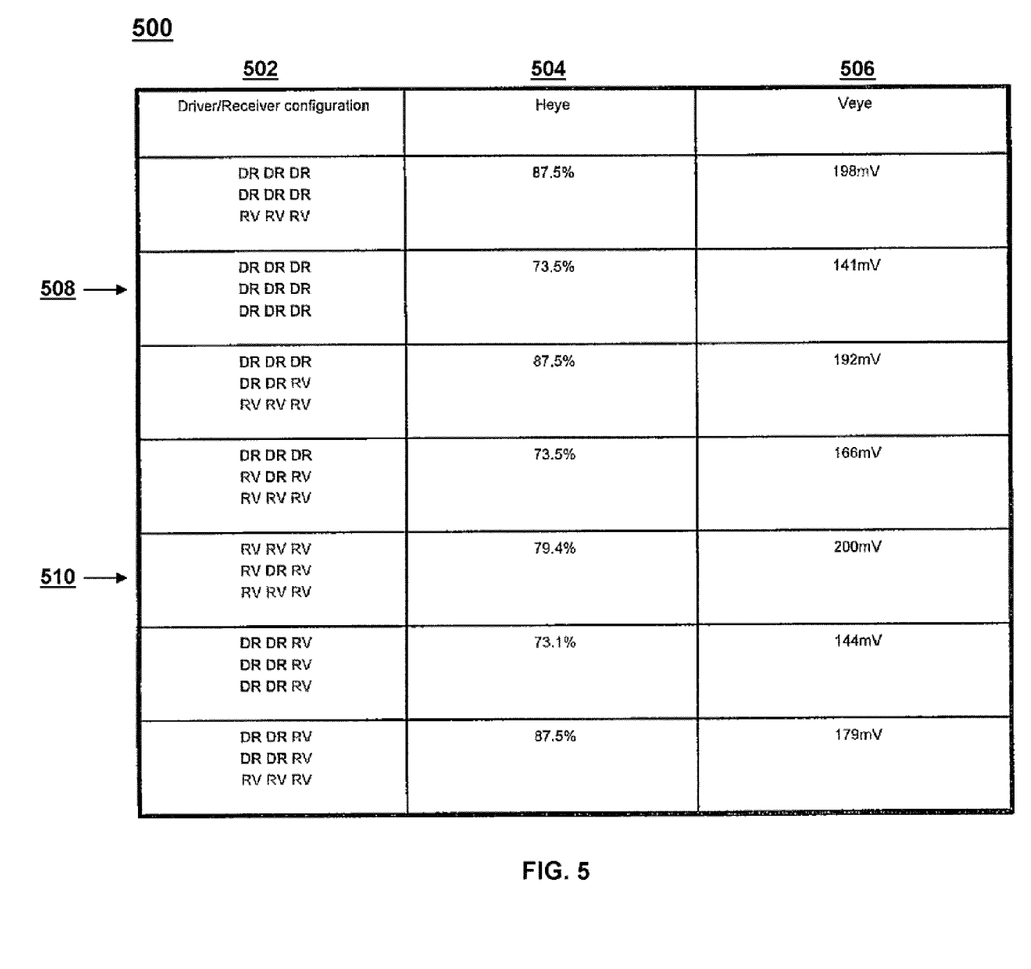
FIG. 5 is a table which outlines the maximum horizontal eye as a percentage of unit interval (UI) and the vertical eye (Veye) as a function of the transmitter and receiver placement, according to one embodiment.

FIG. 5 is a table which outlines the maximum horizontal eye as a percentage (%) of unit interval (UI) and the vertical eye (Veye), both measured at the receiver end of the victim trace, as a function of the transmitter and receiver placement, according to one embodiment. Table 500 comprises the following three columns: (a) driver/receiver configuration column 502, Horizontal eye (Heye) column 504 and Vertical eye (Veye) column 506. Table 500 provides eye pattern results for seven distinct receiver/driver configurations shown via the rows of the table rows. First configuration row 508 and second configuration row 510 are specifically referenced as examples for discussion herein.

Table 500 provides the results of a system level simulator in which the total wire trace length is approximately 11 cm in low loss on-module wires. Thus, transmitter/receiver signals undergo a small attenuation level, which is determined to be approximately −0.62 dB at 3 Gbps. As a result, the corresponding far-end noise (i.e., forward crosstalk) is much larger (i.e., by a factor of almost 10) than the near-end noise (i.e., backward crosstalk). When the victim trace is exclusively surrounded by eight transmitter traces, as illustrated in FIG. 4A, first configuration row 508 indicates a vertical eye level of 141 mV. Also, Heye is 73.5% of UI. Veye provides an indication of the additive noise. Heye indicates the level of timing synchronization and jitter effects. However, when the victim trace is exclusively surrounded by eight receiver traces, as illustrated in FIG. 4B, second configuration row 510 indicates a vertical eye level of 200 mV. The corresponding Heye is 79.4% of UI. Thus, as expected, configuration 420 provides significant improvement over configuration 400, especially given the fact that the achievable margins are "tighter" at higher signal frequencies.

Figure 6:
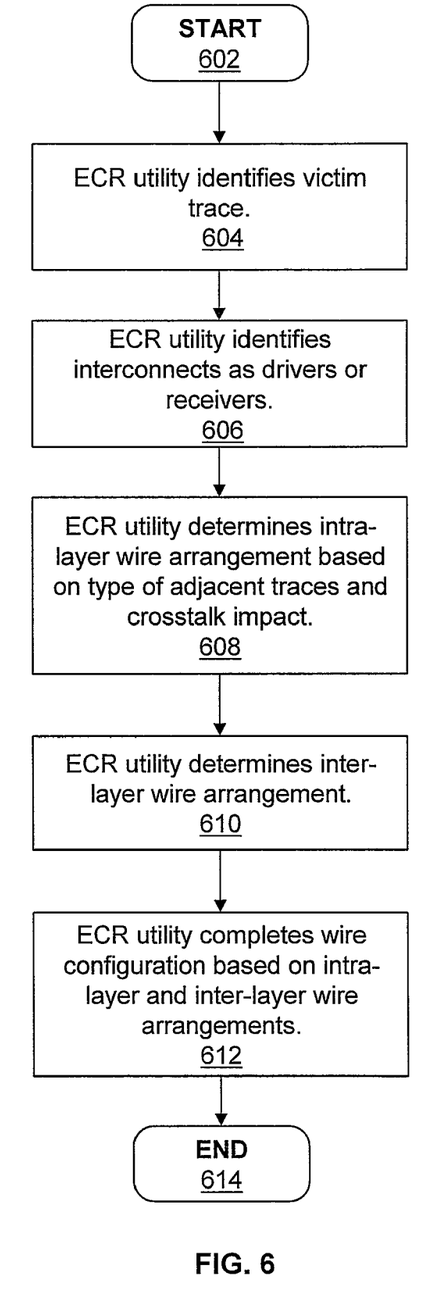
FIG. 6 is a flow chart illustrating the process of minimizing crosstalk by optimally arranging higher crosstalk contributors with lower crosstalk contributors in the wire trace configuration for an electrical system/device, according to one embodiment.

FIG. 6 is a flow chart illustrating the method by which the above processes of the illustrative embodiments are completed. In particular, FIG. 6 illustrates the process of minimizing crosstalk by optimally arranging higher crosstalk contributors with lower crosstalk contributors in the wire trace configuration for an electrical system/device. Although the method illustrated in FIG. 6 may be described with reference to components shown in FIGS. 1-5, it should be understood that this is merely for convenience and alternative components and/or configurations thereof can be employed when implementing the method. Key portions of the method may be completed by ECR utility 110 executing on a processor (e.g., Processor 102 within DPS 100 (FIG. 1) and controlling specific operations of/on DPS 100. The method is thus described from the perspective of either/both ECR utility 110 and DPS 100.

The process of FIG. 6 begins at initiator block 602 and proceeds to block 604, at which ECR utility 110 identifies the victim trace. At block 606, ECR utility 110 identifies connecting paths between components within an electrical module as transmitter paths or receiver paths. At block 608, ECR utility 110 initiates a process to determine the intra-layer trace layout based on one or more of: (a) crosstalk noise level associated with an inter-layer placement of adjacent traces; (b) crosstalk noise level associated with an intra-layer placement of adjacent traces; and (c) crosstalk noise level which affects one or more particular components based on a first candidate placement of said second trace; (d) crosstalk noise level that said second trace provides in a second candidate placement as a non-adjacent trace; and (e) one or more system component specifications.

At block 610, ECR utility 110 initiates a process to determine the inter-layer trace layout based on one or more of: (a) crosstalk noise level associated with an inter-layer placement of adjacent traces; (b) crosstalk noise level associated with an intra-layer placement of adjacent traces; and (c) crosstalk noise level which affects one or more particular components based on a first candidate placement of said second trace; (d) crosstalk noise level that said second trace provides in a second candidate placement as a non-adjacent trace; and (e) one or more system component specifications. At block 612, ECR utility 110 completes wire trace configuration based on the intra-layer and inter-layer wire arrangements. ECR utility 110 then stores and/or outputs the wire trace configuration as the design configuration for the particular device being designed/manufactured. The process ends at block 614.

In the flow chart above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or logic. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as memory 106 of DPS 100 (FIG. 1) or a hard disk, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A data processing system having a processor performing a method for reducing crosstalk in a pre-defined system design, the method comprising the processor executing an enhanced crosstalk reduction utility;

the processor identifying, based on a pre-identified system design of a device, one or more of: a first set of one or more interconnect paths as driven traces; and a second set of one or more interconnect paths as receiver traces; and the processor generating an optimal layer configuration for placement of the driven traces and receiver traces within one or more layers of the device, the generating further comprising:
identifying, from the driven traces and receiver traces, a primary victim trace that is a victim trace of crosstalk from at least two adjacent traces in a first layer of the pre-identified system design, wherein the primary victim trace is identified based on (1) a central location of an interconnect of the primary victim trace and (2) the primary victim trace having a largest number of adjacent signal traces versus all other traces within the driven traces and receiver traces;
determining whether a second trace is placed as one of an intra-layer adjacent trace to the primary victim trace and an inter-layer adjacent trace to the primary victim trace; and
placing the primary victim trace according to design specifications and layout feasibility;
wherein the optimal layer configuration provides an optimally low level of crosstalk noise to receivers at one end of the primary victim trace of the pre-identified system, wherein the primary victim trace is one of a driven trace and a receiver trace, and wherein the layer configuration substantially avoids an implementation of isolation layers in the device for increasing separation between driver and receiver components of the device.

2. The method of claim 1, wherein the generating further comprises:
determining whether the second trace is placed as one of an intra-layer adjacent trace to the primary victim trace and an inter-layer adjacent trace to the primary victim trace is based on one or more of:
crosstalk noise level associated with an inter-layer placement of adjacent traces;
crosstalk noise level associated with an intra-layer placement of adjacent traces;
crosstalk noise level which affects one or more particular components based on a first candidate placement of the second trace;
crosstalk noise level that the second trace provides in a second candidate placement as a non-adjacent trace; and
one or more system component specifications;
wherein the inter-layer adjacent trace is separated from the primary victim trace by an inter-layer adjacent distance and the intra-layer adjacent trace is separated from the primary victim trace by an intra-layer adjacent distance; and
wherein the second trace is one of a driven trace and a receiver trace, wherein the driven trace is a first type of trace and the receiver trace is a second type of trace different from the first type of trace.

3. The method of claim 1, further comprising:
the processor configuring one or more of:
one or more receiver traces adjacent to transmitter traces, wherein the one or more receiver traces replace one or more aggressor traces; and
a multi-layer wire arrangement, within the system design, without utilizing isolation layers.

4. The method of claim 1, further comprising:
the processor generating an output of the system design based on the optimal layer configuration;
wherein the design specifications include one or more of:
specifications of the system design;
specifications of one or more module component sets; and
specifications of the device.

5. An integrated circuit designed according to the method of claim 1.

6. The method of claim 1, the processor generating further comprising:
identifying, within the first layer, a crosstalk trace that is a contributor of crosstalk;
determining a level of crosstalk contributed by the crosstalk trace;
in response to determining the crosstalk trace contributes to a low level of crosstalk, placing the crosstalk trace adjacent to at least one receiver trace; and
in response to determining the crosstalk trace contributes to a high level of crosstalk:
determining a maximum separation distance of adjacent traces from one or more adjacent traces within the first layer; and
placing the crosstalk trace within the first layer at the maximum separation distance from the one or more adjacent traces.

7. The method of claim 1, further comprising:
optimizing the optimal layer configuration based on limiting a number of adjacent traces.

8. A data processing system comprising:
a memory having stored therein a design of an electrical circuit;
at least one processor; and
a utility that when executed on the at least one processor causes the data processing system to:
identify, based on a pre-identified system design of a device, one or more of a first set of one or more interconnect paths as driven traces and a second set of one or more interconnect paths as receiver traces;
generate an optimal layer configuration for placement of the driven traces and receiver traces within one or more layers of the device, the utility causing the data processing system to generate the optimal layer configuration further comprising code that causes the data processing system to:
identify, from the driven traces and receiver traces, a primary victim trace that is a victim trace of crosstalk from at least two adjacent traces in a first layer of the pre-identified system design, wherein the primary victim trace is identified based on (1) a central location of an interconnect of the primary victim trace and (2) the primary victim trace having a largest number of adjacent signal traces versus all other traces within the driven traces and receiver traces;
determine whether a second trace is placed as one of an intra-layer adjacent trace to the primary victim trace and an inter-layer adjacent trace to the primary victim trace; and
place the primary victim trace and the second trace according to design specifications and layout feasibility;
wherein the optimal layer configuration provides an optimally low level of crosstalk noise to receivers at one end of the primary victim trace of the pre-identified system, wherein the primary victim trace is one of a driven trace and a receiver trace, and wherein the layer configuration substantially avoids an implementation of isolation layers in the device for increasing separation between driver and receiver components of the device.

9. The data processing system of claim 8, wherein the functions for generating further comprises functions that enable the data processing system to:
  determine whether the second trace is placed as one of an intra-layer adjacent trace to the primary victim trace and an inter-layer adjacent trace to the primary victim trace is based on one or more of:
    crosstalk noise level associated with an inter-layer placement of adjacent traces;
    crosstalk noise level associated with an intra-layer placement of adjacent traces;
    crosstalk noise level which affects one or more particular components based on a first candidate placement of the second trace;
    crosstalk noise level that the second trace provides in a second candidate placement as a non-adjacent trace; and
    one or more system component specifications;
  wherein the inter-layer adjacent trace is separated from the primary victim trace by an inter-layer adjacent distance; and the intra-layer adjacent trace is separated from the primary victim trace by an intra-layer adjacent distance; and
  wherein the second trace is one of a driven trace and a receiver trace, wherein the driven trace is a first type of trace and the receiver trace is a second type of trace different from the first type of trace.

10. The data processing system of claim 8, further comprising additional functions that when executed by the processor enable the data processing system to:
  configure one or more of:
    one or more receiver traces adjacent to transmitter traces, wherein the one or more receiver traces replace one or more aggressor traces; and
    a multi-layer wire arrangement, within the system design, without utilizing isolation layers.

11. The data processing system of claim 8, further comprising additional functions that when executed by the processor enable the data processing system to:
  generate an output of the system design based on the optimal layer configuration;
  wherein the design specifications include one or more of:
    specifications of the system design;
    specifications of one or more module component sets; and
    specifications of the device.

12. An integrated circuit designed according to the data processing system of claim 8.

13. The data processing system of claim 8, wherein the utility that causes the data processing system to generate the optimal layer configuration further comprises code that enables the data processing system to:
  identify, within the first layer, a crosstalk trace that is a contributor of crosstalk;
  determine a level of crosstalk contributed by the crosstalk trace;
  in response to determining the crosstalk trace contributes to a low level of crosstalk, place the crosstalk trace adjacent to at least one receiver trace; and
  in response to determining the crosstalk trace contributes to a high level of crosstalk:
    determine a maximum separation distance of adjacent traces from one or more adjacent traces within the first layer; and
    place the crosstalk trace within the first layer at the maximum separation distance from the one or more adjacent traces.

14. The data processing system of claim 8, the utility further comprising additional code that when executed by the processor enable the data processing system to:
  optimize the optimal layer configuration based on limiting a number of adjacent traces.

15. A computer program product comprising:
  a non-transitory machine readable storage device and program code on the machine readable storage device that when executed within a data processing device causes the data processing system to provide the functionality of:
    identifying, based on a pre-identified system design of a device, one or more of: a first set of one or more interconnect paths as driven traces; and a second set of one or more interconnect paths as receiver traces; and
    generating an optimal layer configuration for placement of the driven traces and receiver traces within one or more layers of the device, the generating further comprising:
      identifying, from the driven traces and receiver traces, a primary victim trace that is a victim trace of crosstalk from at least two adjacent traces in a first layer of the pre-identified system design, wherein the primary victim trace is identified based on (1) a central location of an interconnect of the primary victim trace and (2) the primary victim trace having a largest number of adjacent signal traces versus all other traces within the driven traces and receiver traces;
      determining whether a second trace is placed as one of an intra-layer adjacent trace to the primary victim trace and an inter-layer adjacent trace to the primary victim trace; and
      according to design specifications and layout feasibility, placing the primary victim trace and the second trace;
      wherein the optimal layer configuration provides an optimally low level of crosstalk noise to receivers at one end of the primary victim trace of the pre-identified system, wherein the primary victim trace is one of a driven trace and a receiver trace, and wherein the layer configuration substantially avoids an implementation of isolation layers in the device for increasing separation between driver and receiver components of the device.

16. The computer program product of claim 15, wherein the program code for generating further comprises program code for:
  determining whether the second trace is placed as one of an intra-layer adjacent trace to the primary victim trace and an inter-layer adjacent trace to the primary victim trace, based on one or more of:
    crosstalk noise level associated with an inter-layer placement of adjacent traces;
    crosstalk noise level associated with an intra-layer placement of adjacent traces;
    crosstalk noise level which affects one or more particular components based on a first candidate placement of the second trace;
    crosstalk noise level that the second trace provides in a second candidate placement as a non-adjacent trace; and
    one or more system component specifications;
  wherein the inter-layer adjacent trace is separated from the primary victim trace by an inter-layer adjacent distance and the intra-layer adjacent trace is separated from the primary victim trace by an intra-layer adjacent distance; and wherein the second trace is one of a driven trace and a receiver trace, wherein the driven trace is a first type of trace and the receiver trace is a second type of trace different from the first type of trace.

17. The computer program product of claim 15, the program code further comprising program code for:

configuring one or more of:
one or more receiver traces adjacent to transmitter traces, wherein the one or more receiver traces replace one or more aggressor traces; and
a multi-layer wire arrangement, within the system design, without utilizing isolation layers; and generating an output of the system design based on the optimal layer configuration;

wherein the design specifications include one or more of:
specifications of the system design;
specifications of one or more module component sets; and
specifications of the device.

18. An integrated circuit designed according to the computer program product of claim 15.

19. The computer program product of claim 15, wherein the program code for generating further comprises program code for:

identifying, within the first layer, a crosstalk trace that is a contributor of crosstalk;
determining a level of crosstalk contributed by the crosstalk trace;
in response to determining the crosstalk trace contributes to a low level of crosstalk, placing the crosstalk trace adjacent to at least one receiver trace; and
in response to determining the crosstalk trace contributes to a high level of crosstalk:
determining a maximum separation distance of adjacent traces from one or more adjacent traces within the first layer; and
placing the crosstalk trace within the first layer at the maximum separation distance from the one or more adjacent traces.

20. The computer program product of claim 15, the program code further comprising program code for:
optimizing the optimal layer configuration based on limiting a number of adjacent traces.

* * * * *